(12) United States Patent
Rimi et al.

(10) Patent No.: US 7,386,006 B2
(45) Date of Patent: *Jun. 10, 2008

(54) PROCESS AND DEVICE FOR SYNCHRONIZATION AND CODEGROUP IDENTIFICATION IN CELLULAR COMMUNICATION SYSTEMS AND COMPUTER PROGRAM THEREFOR

(75) Inventors: Francesco Rimi, Alcamo (IT); Giuseppe Avellone, Palermo (IT); Francesco Pappalardo, Paternò (IT); Filippo Speziali, S. Ilario Jonico (IT); Agostino Galluzzo, Palma di Montechiaro (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 869 days.

This patent is subject to a terminal disclaimer.

(21) Appl. No.: 10/768,400

(22) Filed: Jan. 30, 2004

(65) Prior Publication Data

US 2004/0223517 A1 Nov. 11, 2004

(30) Foreign Application Priority Data

Jan. 31, 2003 (EP) .................................. 03425058

(51) Int. Cl.
*H04J 3/06* (2006.01)
*H04B 7/00* (2006.01)

(52) U.S. Cl. ...................... 370/464; 370/503; 370/510; 370/512; 370/514; 455/502

(58) Field of Classification Search ................. 370/509, 370/342; 375/365; 455/502
See application file for complete search history.

(56) References Cited

U.S. PATENT DOCUMENTS 6,002,710 A * 12/1999 Hendrickson et al. ...... 375/149
6,363,060 B1   3/2002 Sarkar ......................... 370/342
6,504,830 B1 * 1/2003 Ostberg et al. ............. 370/342
7,123,929 B2 * 10/2006 Avellone et al. ............ 455/502

FOREIGN PATENT DOCUMENTS

WO    00/054424     9/2000
WO    0067404       11/2000

OTHER PUBLICATIONS

Lee et al., *A Searcher Design for the Synchronization Channel of WCDMA*, VTC 2000-Fall. IEEE VTS 52$^{nd}$ Vehicle Technology Conference, Boston, MA, Sep. 24-28, 2000, IEEE Vehicular Technology Conference, New York, NY: IEEE, US, vol. 3 of 6, Conf. 52, Sep. 24, 2000, pp. 1364-1370.

* cited by examiner

*Primary Examiner*—Kwang Bin Yao
*Assistant Examiner*—Henry Baron
(74) *Attorney, Agent, or Firm*—Lisa K. Jorgenson; Allen, Dyer, Doppelt, Milbrath & Gilchrist, P.A.

(57) ABSTRACT

In a first step, slot synchronization may be obtained by setting in correlation the received signal with a primary sequence, which represents the primary channel, and storing the received signal. During a second step, the correlator may be re-used for correlating the received signal with a secondary sequence corresponding to the secondary synchronization codes. The correlator may include a first filter and a second filter connected in series, which receive a first secondary sequence and a second secondary sequence, which may include Golay sequences. Architectures of parallel and serial types, as well as architectures designed for reusing further circuit parts are also disclosed. The invention is particularly applicable in mobile communication systems based upon standards such as UMTS, CDMA2000, IS95, and WBCDMA.

27 Claims, 7 Drawing Sheets

PROCESS AND DEVICE FOR SYNCHRONIZATION AND CODEGROUP IDENTIFICATION IN CELLULAR COMMUNICATION SYSTEMS AND COMPUTER PROGRAM THEREFOR

FIELD OF THE INVENTION

The present invention relates to the field of telecommunications systems. More particularly, the present invention is particularly applicable to telecommunication systems based upon the Code-Division Multiple Access/Third-Generation Partnership Project Frequency Division Duplex (CDMA/3GPP FDD), and the Code-Division Multiple Access/Third-Generation Partnership Project Time Division Duplex (CDMA/3GPP TDD) standards, for example.

The present invention will be described with reference to the above-noted applications for clarity of explanation. Even so, it will be understood that the present invention may be used for other applications as well. More particularly, the invention is applicable to various telecommunications systems in which operating conditions are similar to those described further below occur. By way of non-limiting example, such applications may include satellite telecommunication systems and mobile cellular systems corresponding to the UMTS, CDMA2000, IS95 or WBCDMA standards.

BACKGROUND OF THE INVENTION

To enable acquisition of a base station by a mobile terminal included in a telecommunications system based upon the standard 3GPP FDD mode, TDD mode, etc., the corresponding receiver needs to perform frame synchronization and identification of the so-called codegroup. These functions are important for the execution of the subsequent steps of the cell search system.

In particular, when a mobile terminal is turned on, it does not have any knowledge of the timing of the transmitting cell to which it is to be assigned. The 3GPP standard proposes an initial cell search procedure for acquiring the cell signal and synchronizing therewith. This synchronization procedure basically includes three steps: (1) slot synchronization; (2) frame synchronization and identification of the codegroup, i.e., the group of cell codes; and (3) identification of the scrambling code.

In the implementation of the second step, it is assumed that the slot synchronization has previously been obtained during the first step. At this point, to obtain the frame synchronization and identify the codegroup (to which the offset of the cell is associated), in the second step the Secondary Synchronization Channel (SSCH) is used. More particularly, codes or words of 256 chips (i.e., letters) are transmitted at the beginning of each slot.

The sixteen 256-chip complex codes used by the standard are generated as follows. A first sequence at chip rate b having a repetition period of 16 (i.e., repeating every 16 elements) is multiplied by a sequence·16 times slower according to the following two formulas to obtain the base sequence z, where:

$z = <b, b, b, -b, b, b, -b, -b, b, -b, b, -b, -b, -b, -b, -b>$; and $b = <1, 1, 1, 1, 1, 1, -1, -1, -1, 1, -1, 1, -1, 1, 1, -1>$.

The base sequence z is then multiplied element by element by a Hadamard code of length 256 chosen according to the following rule. If m is the number identifying the Secondary Synchronization Code (SSC) to be generated, the number of the Hadamard code to be multiplied by the sequence z is equal to 16×(m−1), with m ranging from 1 to 16. Generation of the synchronization codes SSC for the TDD mode is similar to the one used for the FDD mode, with the difference being that, in the former case, just twelve of the sixteen codes SSC are used.

Moreover, the FDD mode and TDD mode differ from one another with respect to the way in which the codegroups are associated with the contents of the secondary synchronization channel SSCH. In the FDD mode, on the secondary synchronization channel SSCH a code SSC is sent for each slot, in 15 consecutive slots. There are 64 possible sequences indicated by the standard, which belong to a Reed-Solomon code defined therein. Each sequence identifies a group of eight primary scrambling codes, among which the aforementioned third step of the cell search procedure will identify the code of the cell onto which the first two steps of the procedure have locked.

In the TDD mode, each slot containing the channel SCCH contains three codes SSC. According to the standard, four possible sets of three codes are defined, the combination and the relative phases of which define the codegroups. Each codegroup identifies one slot offset between the start of the slot and the start of the code on the channel SSCH, and four possible basic midambles to each of which is associated a scrambling code. The third step of the cell search procedure defines which midamble is used in the Primary Common-Control Physical Channel (P-CCPCH).

Referring to FIG. 1, a schematic representation of an architecture of a known prior art circuit which implements the first step and second step of the cell search procedure is now described. The received signal r is sent in parallel to a first branch 411, which implements the first step of the cell search procedure, and to a second branch 412, which implements the second step of the cell search procedure. Both the circuits of the first branch 411 and the circuits of the second branch 412 operate under the control of a controller, designated by 403, which receives the results of their processing operations.

The first branch 411 includes a matched filter 401 for carrying out the correlation on the Primary Synchronization Channel (PSC), setting the channel in correlation with a sequence SG structured as a first hierarchical Golay sequence. A subsequent block 402 implements the algorithm of the first step of the cell search procedure. The use of Golay sequences to carry out synchronization functions in systems of a spread-spectrum and CDMA type is described, for example, in WO-A-0051392, WO-A-0054424, WO-A-0067404 and WO-A-0067405.

The second branch 412 instead includes a correlation section 404, which operates on the secondary codes SSC. The correlation section 404 is followed by a block 405 which implements the algorithm of the second step of the cell search procedure. Operation of the correlation section 404 is enabled by an appropriate enabling signal EN issued by the controller 403.

Since the circuits that implement the second step of the cell search procedure for the FDD mode identify the individual chip, they are of the type illustrated schematically in FIG. 2, which are described in European patent application EP02425619.0, which is assigned to the Assignee of the present application. These circuits include, at the input, a correlation section including a bank of correlators 10, the outputs of which supply the energies corresponding to the individual chips.

After a possible masking with appropriate weights at block 12, the energies are added in a node 14 and are then stored in a bank of registers 16. Each row of registers 16 represents one of the words of the code that is to be recognized, while the columns represent the possible frame starting points in terms of slots, i.e., 15 possible starting points. A block 18 includes a comparator which enables the search for the maximum value to be carried out on the bank 16. The reason for this is to define both the codegroup CD used by the cell being currently evaluated, and the start of the frame expressed as frame offset OF transmitted by the cell itself. In other words, the frame offset OF is a quantity identifying the frame synchronization with reference to the slot timing obtained in the first step, which is not specifically shown for clarity of illustration.

Accordingly, the circuit illustrated in FIG. 2 essentially uses a bank of correlators in parallel or, alternatively, a bank which performs the fast Hadamard transform, for carrying out correlation. As note above, in the TDD mode the second step of the cell search procedure is instead carried out assuming that the position of the synchronization burst, as well as a first slot synchronization, have been acquired and defined in the first step of the cell search procedure. This is done to obtain the following: slot synchronization, by defining the offset between the start of the slot and the position of the synchronization burst therein; codegroup identification; and further information, such as the cell parameter.

To do so, the secondary synchronization channel SSCH is used. In the synchronization slot and simultaneously on the channel PSC are transmitted three 256-chip codes coming from of a set of twelve complex codes, which represents a subset of the secondary synchronization codes SSC used in the FDD mode. To extract all the requisite information from the channel SSCH, it is necessary to correlate the received signal with the possible codes transmitted on the channel SSCH. Of these codes, it is also necessary to identify the set of three codes with the highest correlation energy and to use their phases to define, in accordance with the standard, the corresponding parameters of slot offset (i.e., the distance in time between the start of the slot and the start of the synchronization code), codegroup, and frame number (even or odd frame).

The above operation is carried out by a circuit that includes correlation section including twelve matched filters arranged in parallel. This approach is schematically illustrated in the diagram of FIG. 3, where a bank 20 of twelve complex finite impulse response (FIR) filters, which are coupled to the twelve possible secondary synchronization codes SSC. The samples of the received signal r are sent at the input to the bank 20 of FIR filters. On the twelve outputs of the bank 20, signals indicating the correlation energies corresponding to the codes SSC are generated. These signals are sent to a system 21, for detecting the maximum value.

The system 21 for detecting the maximum value identifies a given number (equal to three) of codes SSC having the highest correlation energy. These codes are sent to a comparison block designated by 22. The block 22 compares the codes with vales in a table. More particularly, the table stores, according to the possible combinations of the phase differences of the set of three codes SSC identified, corresponding codegroups CD, slot offsets OS, and frame numbers FN, which are then supplied at the output by the comparison block 22.

An alternate architecture for implementing the second step of the cell search procedure in the TDD mode is shown in FIG. 4, which is described in detail in Italian patent application T02002A001082, also assigned to the present Assignee. Here, the received signal r is sent at the input to a block 110, which carries out a first correlation operation on a first sequence 16 chips long. The received signal r at output from block 110 is sent to a bank of correlators 111, which forms the correlation section. The samples of the received signal r are also stored in a storage unit 112.

The correlator bank 111 includes only four correlator circuits, one for each code set. The bank 111 receives four "first" codes SSC from a system 113 for generating codes, each one of which belongs to and identifies one of the four possible code sets within the set of codes SSC. There are twelve codes SSC in all, and each code set corresponds to a "first" code identifying the set, and a subset of remaining codes corresponds to the other two codes of the set. The correlation operation performed in block 111 is hence able to supply, at its output, an estimate of the code set received.

In this connection, a block 114 carries out a search for the maximum value received from the correlator bank 111 on the energies corresponding to the first four codes SSC supplied by the system. It also supplies at its output a first code SSC having the best correlation energy, and with the corresponding phase offset. In this way, a code set CS to which the first code SSC belongs is identified.

The first code SSC and its phase offset are to be sent on to a comparison block 115, while the information on the code set is sent to a controller designated by 116. The controller 116 presides over operation of the circuit and, in particular, is designed to supply the code-generation system 113 with the information on the "first" four codes SSC to be generated for identifying the four code sets.

Based upon the first code and the corresponding code set CS identified by the search for the maximum value carried out in the block 114, the controller 116 sends to the code-generation system 113 the information regarding which other codes SSC are to be generated for the correlation operation with the received signal r stored in the storage unit 112. The above other codes are simply the remaining two codes SSC in the subset that completes the code set corresponding to the first code selected by the search carried out by block 114.

Upstream of the bank 111, a multiplexer 120 is provided, which is driven by the controller 116 and selects the output of the block 110 or the output of the storage unit 112 for the bank 111. In this way, the received signal r, in addition to being stored in the unit 112, is initially sent directly to the block 111, where it is correlated with the first four codes that identify the four code sets coming from block 113. Subsequently, once the reference code set has been identified (as a result of the search carried out in the unit 114), the samples of the received signal r stored in the unit 112 can be sent to the block 111 to be correlated with the two remaining codes of the aforesaid code set. The correlator bank 111 is equipped with a correlator memory 121, in which the first code SSC of the detected code set is stored.

Based upon the information regarding the selected code set CS, the controller 116 issues a command to the code-generation system 113. This is done so that the latter will generate the two codes corresponding to the two codes that are missing for composing the set of three codes of the code set CS to make a correlation with the samples of the received signal r stored in the storage unit 112. The result of this correlation operation (which is carried out, so to speak, by "recycling" two of the correlators contained in the bank 111) is also supplied to the block 115, where the set of three codes of the code set CS is recomposed. This set of three codes can be used, together with the corresponding phases, for the comparison with the standard tables to extract the corresponding parameters from the table contained in the comparison block 115.

The prior art approaches illustrated in FIGS. 1-4 thus require allocation of a certain amount of memory and, consequently, of area on the chip. As such, a consequent power consumption for implementing the correlation section for the second step of the cell search procedure results.

SUMMARY OF THE INVENTION

In view of the foregoing background, it is therefore an object of the present invention to provide an architecture that may carry out the functions described above in a simplified way. More particularly, this may include performing the second step of the cell search procedure, as well as a search for the codegroup and offset using a simplified hardware, to reduce the computational complexity and, thus, the requisite memory and power consumption.

According to the present invention, this object is achieved by a process having the characteristics set forth in the claims that follow. The invention also relates to a corresponding device, as well as to a corresponding computer program product, directly loadable into the memory of a digital computer which includes software code portions for performing the process according to the invention when run on the computer.

Basically, the solution according to the present invention involves simplifying the processing circuits and the size of the corresponding memory, as well as reducing the computational complexity. At the same time, the solution according to the invention enables a circuit to be obtained which allows sharing of parts between the FDD and TDD systems (3.84-Mcps version) to obtain compact dual-mode FDD/TDD systems. As compared to certain prior art approaches, the solution proposed herein, which is based upon a technique of recycling of the acquired data, is simpler, occupies less space, and consumes less power.

BRIEF DESCRIPTION OF THE DRAWINGS

The invention will now be described, by way of non-limiting example, with reference to the attached drawings, in which.

DETAILED DESCRIPTION OF THE PREFERRED EMBODIMENTS

The present invention is based upon the re-use of circuits provided for implementing the first step of the cell search procedure to implement the second step of the cell search procedure. In particular, the present invention is based upon the re-use of the matched FIR filter for the primary channel PSC.

The second step of the cell search procedure is activated after the acquisition of a minimum of slot synchronization in the first step. This synchronization is exact for the TDD mode, and is performed with some tolerance for the FDD mode. This enables the samples of the received signal to be sent to the memory registers which make up the FIR filter used in the second step, starting from the estimated starting instant of the secondary synchronization code SSC.

It is therefore possible to use as the matched FIR filter the same filter used for the primary channel PSC. Also, after all the samples corresponding to a generic synchronization code SSC have been stored, it is possible to update the weights of the FIR filter to carry out the correlation between the samples received and the desired generic code SSC.

Since, both for the FDD mode and for the TDD mode, it is necessary to carry out more than one correlation, it is possible to use parallel techniques (as many weight masks as the number of secondary codes SSC with which the received samples are to be correlated) or serial techniques (just one mask, the weights of which are updated sequentially). Moreover, the solution described herein also allows the FIR filter to be split into two filters so that, to pass from one secondary code SSC to the other, it is only necessary to change the sixteen weights of the second filter. These correspond to the multiplication, element by element, of a Hadamard code of length sixteen with an appropriate Golay sequence as described in the standard.

With the filter split into a first filter and a second filter, for the weights of the first filter it is sufficient to perform a change of sign on eight of the weights to pass from the first Golay sequence for the channel PSC to the first Golay sequence for the code SSC, as can be verified easily from the standard. In addition, the weights of the second filter can be generated in parallel by an appropriate code generator.

Figure 5:
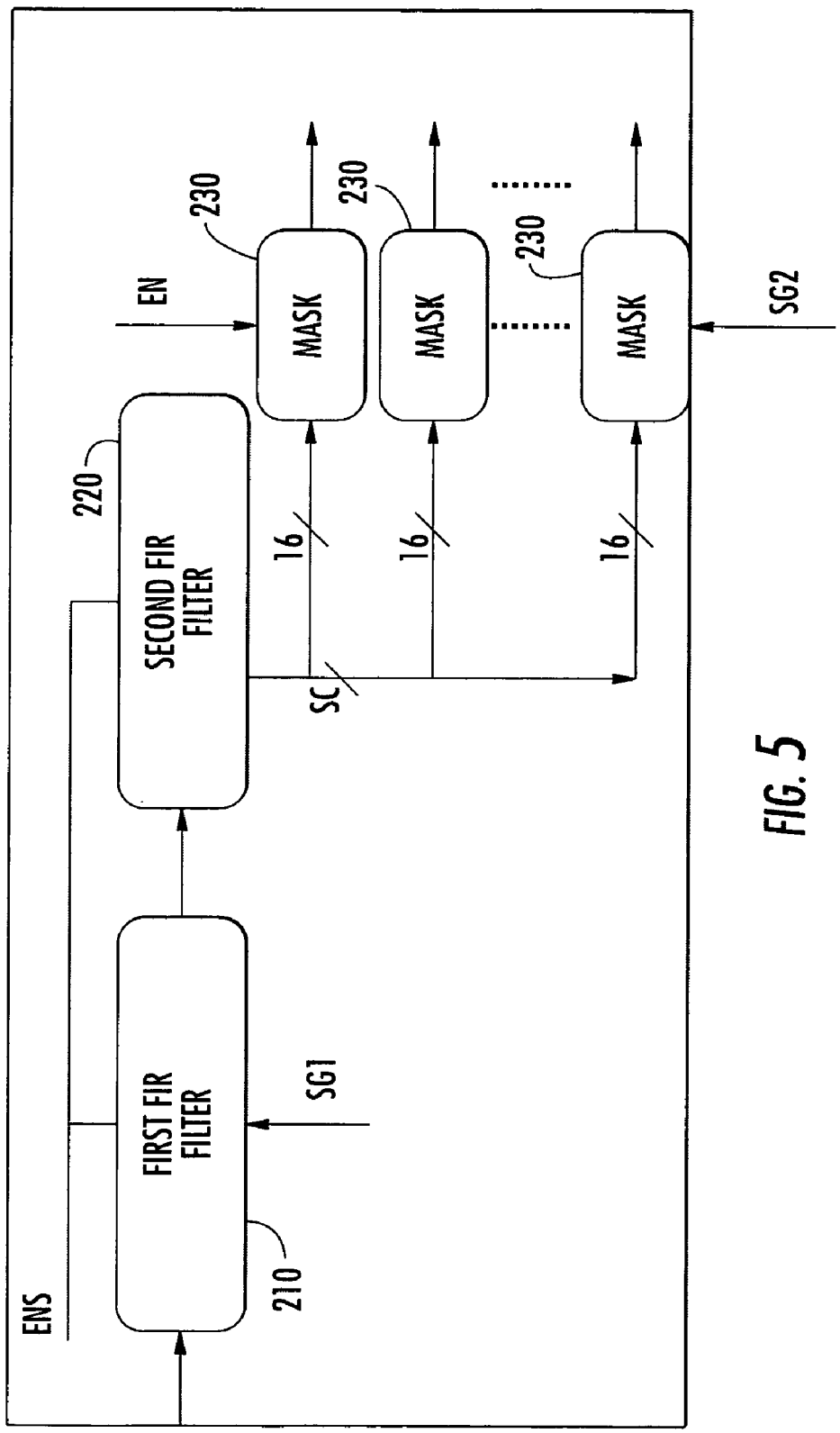
FIG. 5 is a schematic block diagram illustrating a first embodiment of an architecture according to the present invention.

Turning to FIG. 5, a first embodiment of a parallel architecture for implementing the correlation section in FDD mode is now described. The received signal r is sent at the input to a first matched FIR filter 210, which includes sixteen registers and a corresponding number of output taps. The first filter 210 also receives at its input a first Golay sequence SG1 for the secondary code SSC to carry out the filtering as described above.

The signal thus filtered by first filter 210 is sent to a second filter 220, which is also an FIR filter with two hundred and forty registers and sixteen outputs. Operation of the second filter 220 is driven by an enable and stop signal ENS, which likewise operates on the first filter 210, for enabling storage in the filters of the received signal r for the subsequent operation of correlation with the secondary codes SSC.

Figure 1:
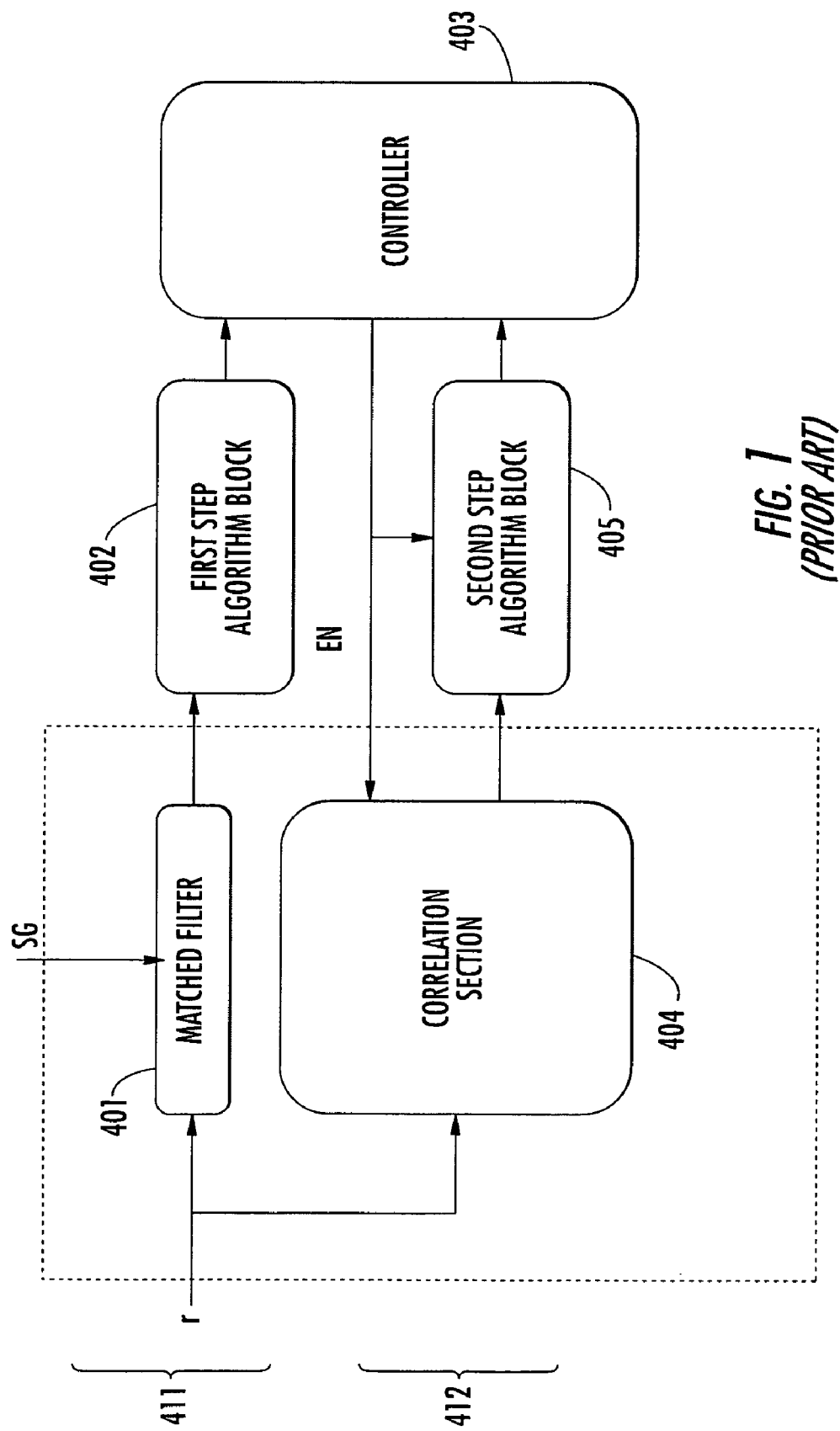
FIGS. 1-4, previously described, are schematic block diagrams illustrating cell search systems in accordance with the prior art.

The first filter 210 and the second filter 220 together make up a matched filter, corresponding to the filter 401 of the primary channel PSC of FIG. 1. This matched filter is re-used for also obtaining the correlation section of the second step of the cell search procedure, at the instant in time at which it receives the Golay sequence SG1 for the secondary codes SSC and the enable and stop signal ENS.

Figure 3:
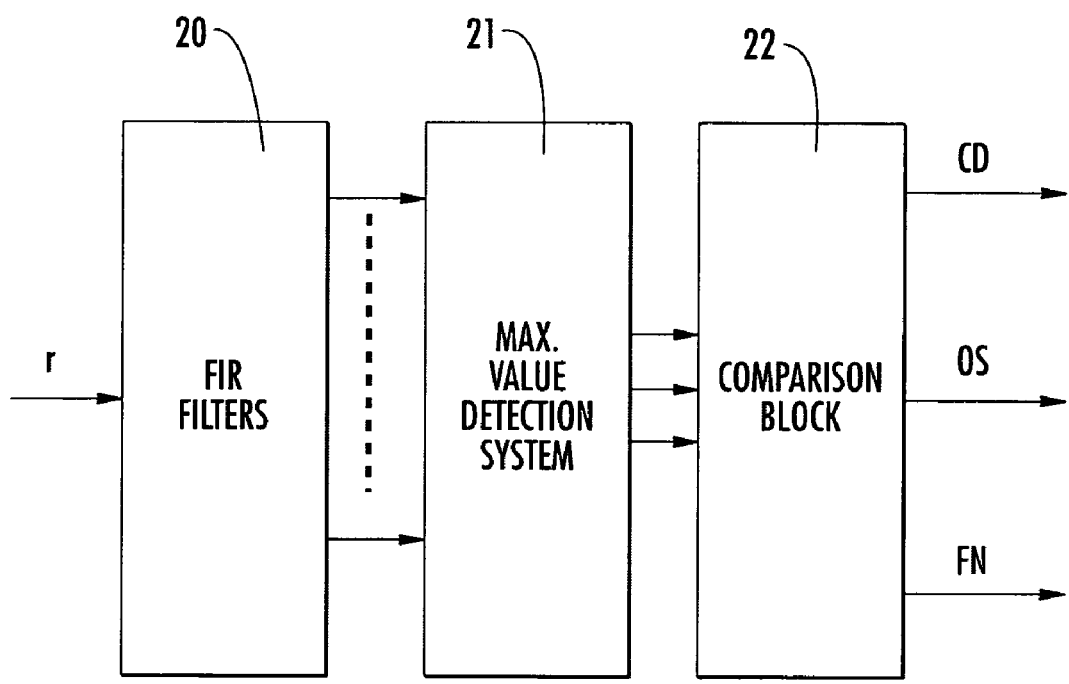

The second filter 220 then supplies at its output a 16-bit correlation signal SC to each of sixteen masks of weights belonging to a block of masks 230, which basically corresponds to the block 22 of FIG. 3. The weights for the masks 230 are made up of a second Golay sequence for the synchronization codes SSC.

Figure 6:
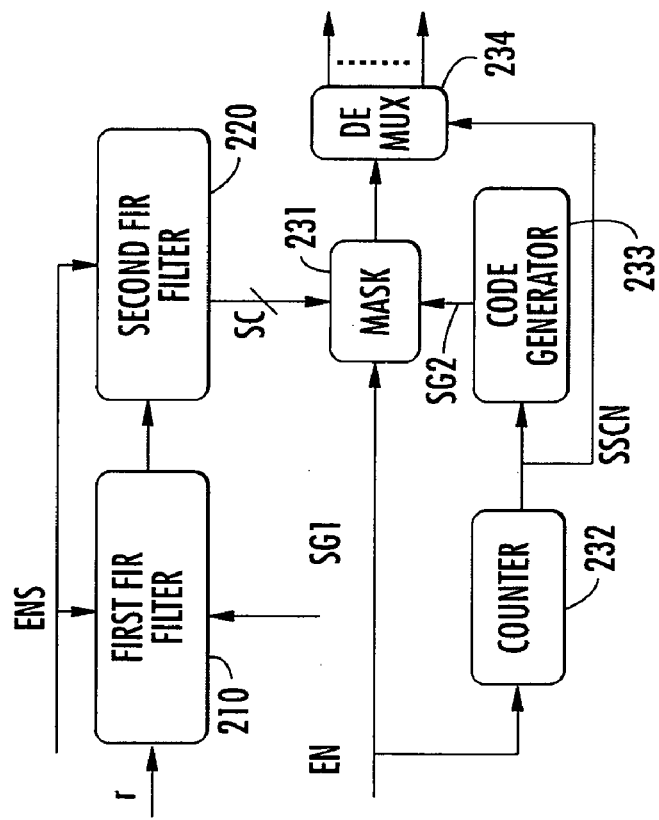
FIG. 6 is a schematic block diagram illustrating a second embodiment of an architecture according to the present invention.

A second embodiment of a serial architecture for implementing the correlation section in FDD mode is illustrated in FIG. 6. The received signal r is provided at the input to the first matched FIR filter 210, which also receives the first Golay sequence SG1 for the code SSC. The first filter 210 is followed by the second filter 220, both of which are driven by the enable and stop signal ENS.

The second filter 220 then supplies at its output the 16-bit correlation signal SC to a mask 231, which is designed for applying the weights corresponding to each secondary code SSC. The mask 231 receives the secondary code SSC to which the weight from an appropriate code generator 233 is to be applied. The code generator supplies the second 16-chip sequences for the secondary codes SSC and is driven in turn by a 16-value counter 232, which supplies the generator with the number SSCN of the secondary codes SSC to be correlated.

Figure 2:
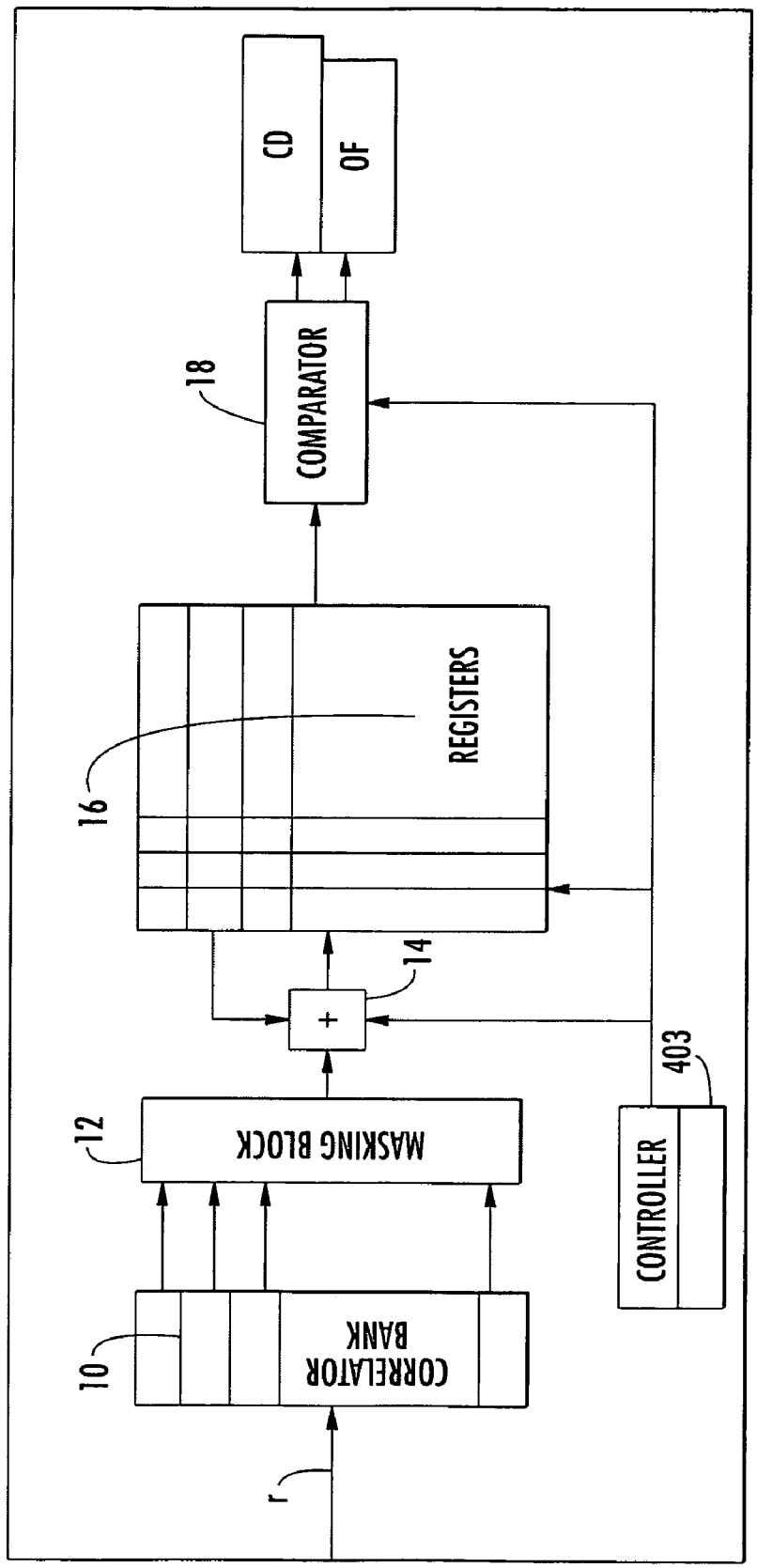

Both the counter 232 and the code generator 233 are also driven by an enabling signal EN. Downstream of the mask 231 there is provided a demultiplexer circuit 234. The demultiplexer circuit 234 which is driven by the secondary-code number SSCN, and it supplies at its output the sixteen correlations to the circuits that complete the second step of the cell search. Circuits similar to the ones used for the correlation circuit in serial and parallel FDD mode, as shown in FIGS. 4 and 5, can be used for the correlation section in the TDD mode, substantially replacing the block 20 of FIG. 2.

Figure 4:
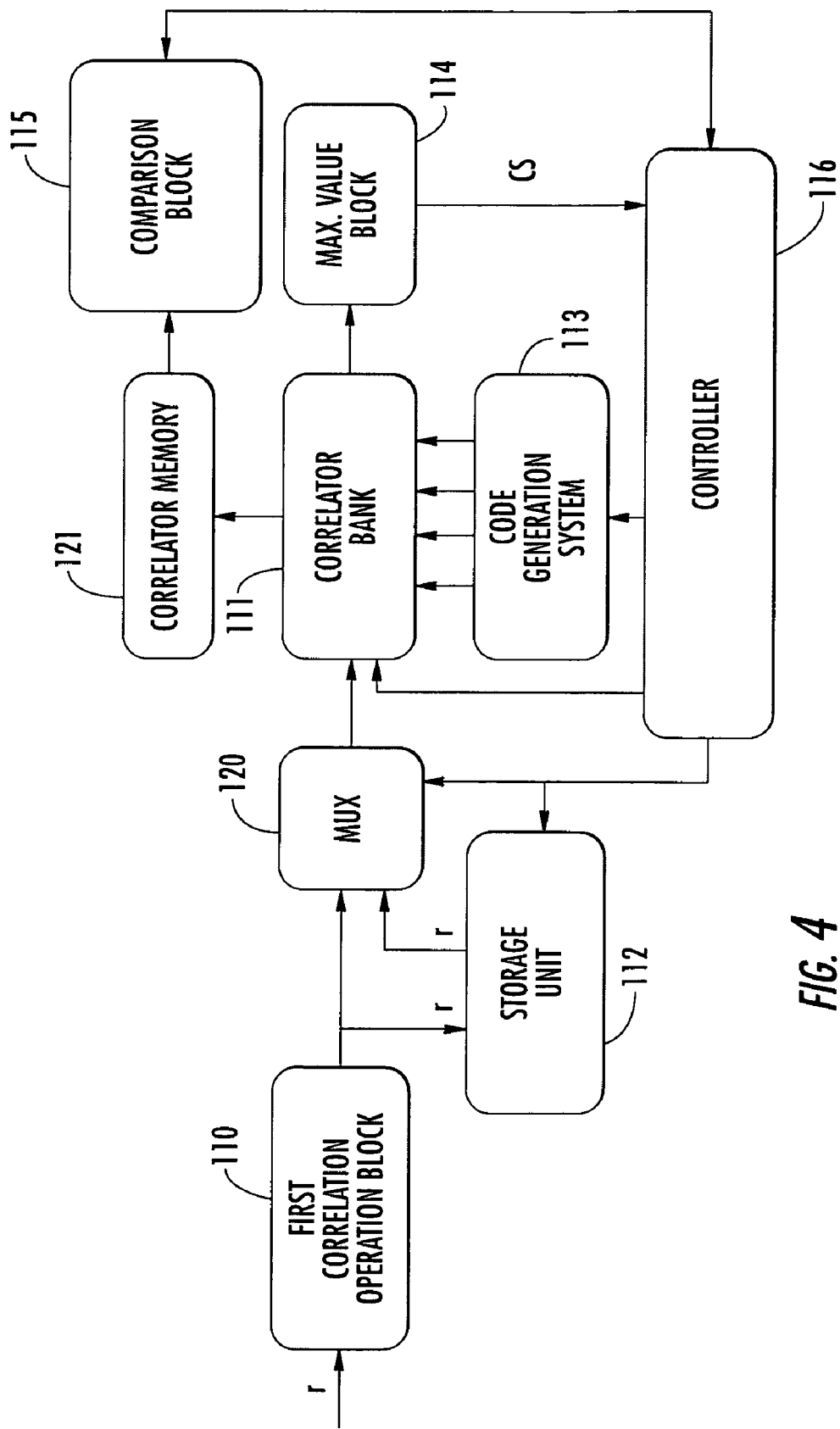
Figure 7:
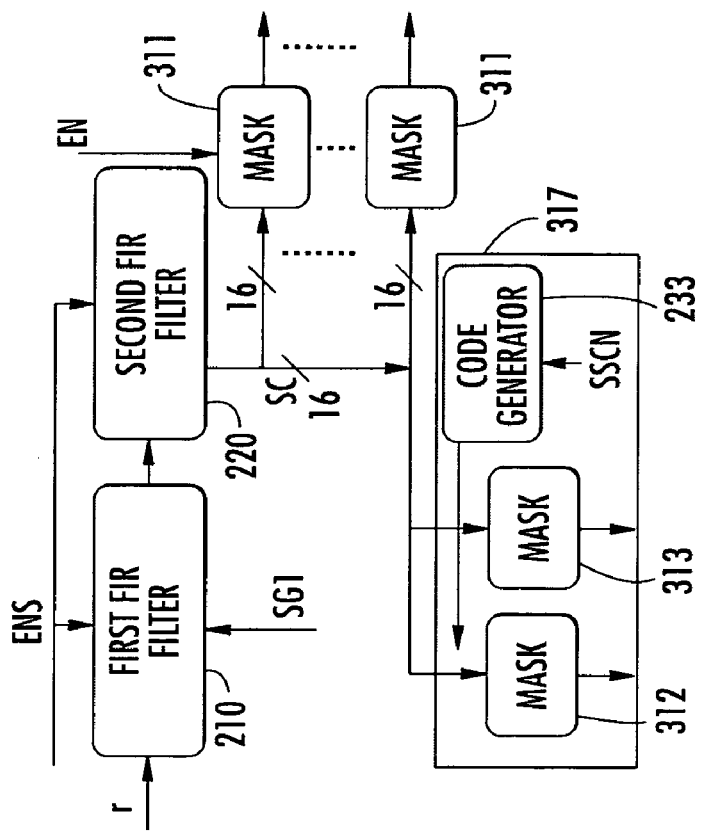
FIG. 7 is a schematic block diagram illustrating a third embodiment of an architecture according to the present invention.

Referring additionally to FIG. 7, a correlation section designed for being associated with the circuit of FIG. 4 (i.e., a circuit for the TDD mode that avails itself of the particular division of the codegroups into code sets) is now described. The received signal r is provided at the input to the first matched FIR filter 210, which also receives the first Golay sequence SG1 for the secondary code SSC. The first filter 210 is followed by the second filter 220, both of which are driven by the enable and stop signal ENS.

The second filter 220 then supplies at its output the 16-bit correlation signal SC to four masks 311, each of which corresponds to one of the four code sets envisioned by the standard for the TDD mode. The 16-bit output of the second filter is further supplied to a block 317, which is designed to detect the two secondary codes SSC belonging to the code set identified as described with reference to FIG. 3. The block 317 includes a mask 312 for the second secondary code SSC belonging to the code set and a mask 313 for the third secondary code SSC which makes up the identified code set, as well as the code generator 233 for driving the masks 312 and 313. Operation of the block 317 is enabled, as has already been discussed, after identification of the code set to define the phases of the two remaining codes SSC of the code set.

Figure 8:
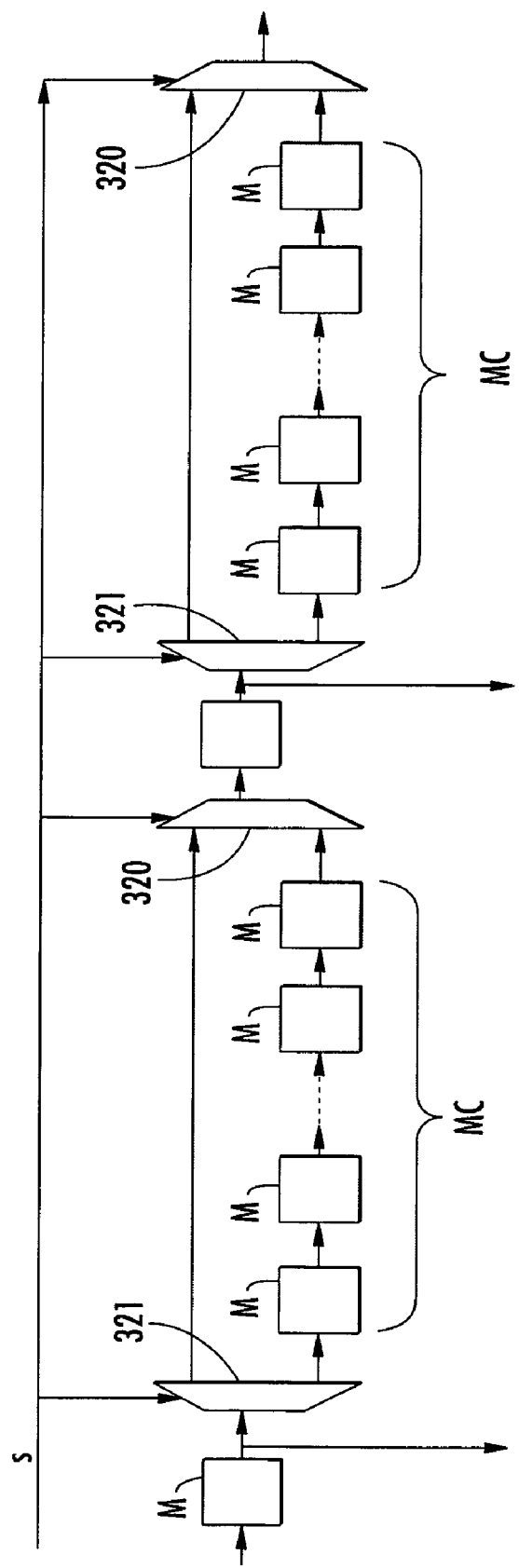
FIG. 8 is a schematic block diagram illustrating a memory circuit used in the architecture according to the present invention.

It should be noted that, in the embodiments of FIGS. 5, 6 and 7, the second filter 220 may be activated just in part, should the output of the first filter 210 be sampled every sixteen chips from start of execution of the second step of the cell search procedure. In this case, only sixteen memory elements would be necessary, which could be obtained from the original structure of the second filter 220, as illustrated in FIG. 8.

In should also be noted that the memory illustrated in this figure is structured as a series of elements including a memory element M set in series to a demultiplexer 321, which is provided with two outputs. One of these outputs is directly connected to the first input of a multiplexer 320, and the other is connected to the multiplexer 320 by a cascade MC of memory elements M, fifteen in number. The output of the memory element M upstream of each demultiplexer 321 constitutes the output tap.

The multiplexer 321 and the demultiplexer 320 are controlled by a select signal S, which allows (or not) the received signal r to pass through the cascades MC of memory elements, using them for filtering the signal r. If the select signal S is, for example, logic zero, the complete filtering structure for the first step of the cell search procedure is obtained. If the select signal S is logic one, it will be possible to bypass the cascades MC of memory elements M and obtain a reduced structure, which is more suitable for execution of the second step of the cell search procedure.

The solution thus far described provides considerable advantages to be achieved as compared with the above-described prior art approaches. The circuit required for implementation of the present invention is significantly smaller than such architectures. In particular, a reduction in terms of hardware and area occupied on the chip is advantageously achieved. What follows is an example illustrating the advantages in terms of memory required with respect to the prior art architectures illustrated in FIGS. 2, 3 and 4.

For the above architectures, in fact, in the case of the FDD mode, seventeen correlators and one FIR filter matched to the PSC sequence are required, while, in the case of the TDD mode, at best, two correlators and one FIR filter matched to the PSC sequence are required. In contrast, the present invention uses just one FIR filter which, during execution of the second step of the cell search procedure, changes its weights to be able to carry out all the correlations with all the possible secondary codes SSC. The acquired data are kept in memory, or the outputs of its intermediate taps are sent to an appropriate set of masks.

A further advantage of the present invention is that the taps of the FIR filter for executing the necessary correlations can be obtained relatively quickly by the use of a parallel generator of OVSF/Walsh-Hadamard codes of the type described, for example, in U.S. patent application publication no. 2002/0080856, or in Italian patent application T02002A000836.

The amount of memory required by the present invention remains practically unchanged. In the serial case, the use of the parallel code generator removes the need for a look-up table or adoption of the small memory associated to the prior art serial generator. The savings in terms of memory as compared to such a look-up table is 256 bits for the FDD mode and 192 bits for the TDD mode. The savings in terms of memory as compared to the prior serial generators is 32 bits.

Additionally, the present invention also advantageously allows for a significant reduction in power consumption. Moreover, the memory bank 112 of FIG. 3 can also be derived from the memory allocated for the second FIR filter, as illustrated in FIG. 8.

Of course, the details of implementation and the various embodiments of the present invention may be varied with respect to those described and illustrated herein, without departing from the scope of the present invention, as defined by the claims that follow.

That which is claimed is:

1. A cellular communications method for a cellular communications system using a plurality of synchronization codes and comprising:

during a first time interval, performing slot synchronization by using at least one correlator to correlate a received signal with synchronization codes in a primary sequence to generate corresponding synchronization values, the at least one correlator comprising a first matched filter and a second matched filter connected in series with a plurality of masking circuits downstream from the second matched filter; and during a second time interval, performing frame synchronization and cell codegroup identification by using the at least one correlator to correlate the received signal with synchronization codes in a secondary sequence to generate corresponding synchronization values.

2. The method of claim 1 further comprising enabling the at least one correlator by generating an enable signal therefor during the second time interval.

3. The method of claim 1 further comprising:
arranging the secondary sequence into a first portion and a second portion; and
providing the first portion of the secondary sequence to the first matched filter, and the second portion of the secondary sequence to the second matched filter.

4. The method of claim 3 further comprising switching from the correlation of one synchronization code in the secondary sequence to another by changing values of the second portion of the secondary sequence.

5. The method of claim 4 wherein the primary sequence has a plurality of weights associated therewith; and further comprising changing signs on at least one of the weights to switch from the primary sequence to the first portion of the secondary sequence.

6. A cellular communications device for a cellular communications system using a plurality of synchronization codes comprising:
at least one correlator for correlating a received signal with synchronization codes in a primary sequence during a first time interval to generate corresponding synchronization values, and for correlating the received signal with synchronization codes in a secondary sequence during a second time interval to generate corresponding synchronization values;
said at least one correlator comprising a first matched filter and a second matched filter connected in series;
a plurality of masking circuits connected downstream from said second matched filter; and
a processor for performing slot synchronization, frame synchronization, and cell codegroup identification based upon the corresponding synchronization values.

7. The cellular communications device of claim 6, wherein the secondary sequence is arranged into a first portion and a second portion, wherein the first portion of the secondary sequence is provided to the first matched filter, and wherein the second portion of the secondary sequence is provided to the second matched filter.

8. A cellular communications device for a cellular communications system using a plurality of synchronization codes comprising:
at least one correlator for correlating a received signal and synchronization codes in a primary sequence for performing slot synchronization on a primary channel, and for correlating the received signal and synchronization codes in a secondary sequence for obtaining corresponding values thereof;
said at least one correlator comprising a first matched filter and a second matched filter connected in series;
a plurality of masking circuits connected downstream from said second matched filter;
a detector for determining at least one maximum value from among the corresponding values and identifying a number of the synchronization codes based thereon; and a processor for determining the frame synchronization and for identifying the codegroup based upon the number of synchronization codes.

9. The device of claim 8 further comprising a controller for generating at least one enabling signal for controlling switching of said at least one correlator between the primary sequence and the secondary sequence.

10. The device of claim 8 wherein said second matched filter comprises a plurality of outputs; and wherein said masking circuits are arranged in parallel, each masking circuit being connected to a respective output of said second matched filter.

11. The device of claim 8 wherein said second matched filter comprises a plurality of outputs; wherein said masking circuits have weights associated therewith for weighting the outputs of said second matched filter; and further comprising a code generator for causing said masking circuits to change respective weights.

12. The device of claim 8 wherein at least some of said masking circuits are arranged in a set of masks corresponding to a first code set; and further comprising a circuit for determining remaining synchronization codes belonging to a subset identified by said processor.

13. The device of claim 8 wherein the received signal complies with Code-Division Multiplex Access/Third-Generation Partnership Project Frequency Division Duplex (CDMA/3GPP FDD) standard.

14. The device of claim 8 wherein the received signal complies with Code-Division Multiplex Access/Third-Generation Partnership Project Time Division Duplex (CDMA/3GPP TDD) standard.

15. The device of claim 8 wherein the received signal complies with at least one of the Universal Mobile Telephone Service (UMTS), Code-Division Multiple Access 2000 (CDMA2000), IS95, and WBCDMA standards.

16. A computer-readable medium having computer-executable instructions for performing steps comprising:
during a first time interval, performing slot synchronization by using at least one correlator to correlate a received signal with synchronization codes in a primary sequence to generate corresponding synchronization values, the at least one correlator comprising a first matched filter and a second matched filter connected in series with a plurality of masking circuits connected downstream from the second matched filter; and
during a second time interval, performing frame synchronization and cell codegroup identification by using the at least one correlator to correlate the received signal with synchronization codes in a secondary sequence to generate corresponding synchronization values.

17. The computer readable medium of claim 16, further comprising computer-executable instructions for performing steps comprising:
arranging the secondary sequence into a first portion and a second portion; and
providing the first portion of the secondary sequence to the first matched filter, and the second portion of the secondary sequence to the second matched filter.

18. A cellular communications device for a cellular communications system using a plurality of synchronization codes comprising:
at least one correlator for correlating a received signal and synchronization codes in a primary sequence for performing slot synchronization on a primary channel, and for correlating the received signal and synchronization codes in a secondary sequence for obtaining corresponding values thereof;

said at least one correlator comprising a first matched filter and a second matched filter connected in series;

said second matched filter comprising a plurality of chains of memory elements being connected in series, and a selector for selectively removing from said series at least one of said chains;

a detector for determining at least one maximum value from among the corresponding values and identifying a number of the synchronization codes based thereon; and a processor for determining the frame synchronization and for identifying the codegroup based upon the number of synchronization codes.

19. The device of claim 18 further comprising a controller for generating at least one enabling signal for controlling switching of said at least one correlator between the primary sequence and the secondary sequence.

20. The device of claim 18 wherein said second matched filter comprises a plurality of outputs; and wherein said masking circuits are arranged in parallel, each masking circuit being connected to a respective output of said second matched filter.

21. A cellular communications device for a cellular communications system using a plurality of synchronization codes comprising:

at least one correlator for correlating a received signal with synchronization codes in a primary sequence during a first time interval to generate corresponding synchronization values, and for correlating the received signal with synchronization codes in a secondary sequence during a second time interval to generate corresponding synchronization values;

said at least one correlator comprising a first matched filter and a second matched filter connected in series;

said second matched filter comprises a plurality of chains of memory elements, said chains of memory elements being connected in series, and a selector for selectively removing from said series at least one of said chains; and a processor for performing slot synchronization, frame synchronization, and cell codegroup identification based upon the corresponding synchronization values.

22. The cellular communications device of claim 21 wherein the secondary sequence is arranged into a first portion and a second portion, wherein the first portion of the secondary sequence is provided to the first matched filter, and wherein the second portion of the secondary sequence is provided to the second matched filter.

23. A cellular communications method for a cellular communications system using a plurality of synchronization codes and comprising:

during a first time interval, performing slot synchronization by using at least one correlator to correlate a received signal with synchronization codes in a primary sequence to generate corresponding synchronization values, the at least one correlator comprising a first matched filter and a second matched filter connected in series with the second matched filter comprising a plurality of chains of memory elements being connected in series, and a selector for selectively removing from the series at least one of the chains; and during a second time interval, performing frame synchronization and cell codegroup identification by using the at least one correlator to correlate the received signal with synchronization codes in a secondary sequence to generate corresponding synchronization values.

24. The method of claim 23 further comprising enabling the at least one correlator by generating an enable signal therefor during the second time interval.

25. The method of claim 23 further comprising:

arranging the secondary sequence into a first portion and a second portion; and providing the first portion of the secondary sequence to the first matched filter, and the second portion of the secondary sequence to the second matched filter.

26. A computer-readable medium having computer-executable instructions for performing steps comprising:

during a first time interval, performing slot synchronization by using at least one correlator to correlate a received signal with synchronization codes in a primary sequence to generate corresponding synchronization values, the at least one correlator comprising a first matched filter and a second matched filter connected in series with the second matched filter comprising a plurality of chains of memory elements being connected in series, and a selector for selectively removing from the series at least one of the chains; and during a second time interval, performing frame synchronization and cell codegroup identification by using the at least one correlator to correlate the received signal with synchronization codes in a secondary sequence to generate corresponding synchronization values.

27. The computer readable medium of claim 26, further comprising computer-executable instructions for performing steps comprising:

arranging the secondary sequence into a first portion and a second portion; and providing the first portion of the secondary sequence to the first matched filter, and the second portion of the secondary sequence to the second matched filter.

* * * * *